No. 868,077. PATENTED OCT. 15, 1907.
A. W. DOREMUS.
BARREL TAPPING DEVICE.
APPLICATION FILED MAR. 26, 1906.
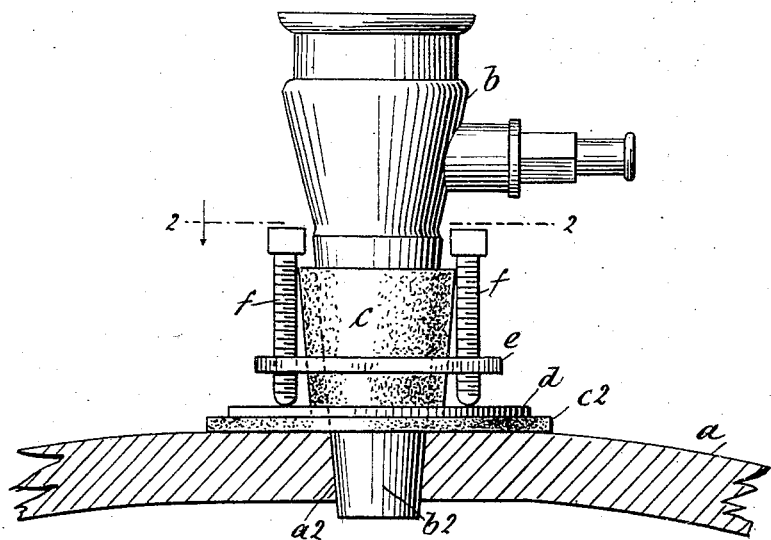
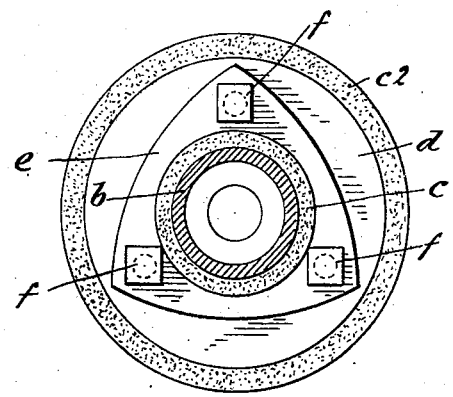
WITNESSES
INVENTOR
Abraham W. Doremus,
BY Edgar Tate & Co.
ATTORNEYS.

UNITED STATES PATENT OFFICE.

ABRAHAM W. DOREMUS, OF BROOKLYN, NEW YORK.

BARREL-TAPPING DEVICE.

No. 868,077.　　　　　Specification of Letters Patent.　　　　　Patented Oct. 15, 1907.

Application filed March 26, 1906. Serial No. 307,955.

*To all whom it may concern:*

Be it known that I, ABRAHAM W. DOREMUS, a citizen of the United States, and residing at Brooklyn, in the county of Kings and State of New York, have invented certain new and useful Improvements in Barrel-Tapping Devices, of which the following is a specification, such as will enable those skilled in the art to which it appertains to make and use the same.

This invention relates to devices for tapping barrels, casks, kegs and the like, and particularly to devices of this class which are employed for tapping beer barrels and similar vessels, and the object thereof is to provide an ordinary tap of this class with a packing device which will securely close the bung hole of the barrel or other vessel when the tap is driven thereinto.

The invention is fully disclosed in the following specification, of which the accompanying drawing forms a part, in which the separate parts of my improvement are designated by suitable reference characters in each of the views, and in which;—

Figure 1 is a side view of a barrel tapping device provided with my improvement and showing the method of its operation, part of the construction being in section; and, Fig. 2 a sectional view of the tapping device on the line 2—2 of Fig. 1.

In the drawing forming part of this specification, I have shown at $a$ a part of one side of a barrel, and at $b$ an ordinary tapping device such as is used in tapping beer barrels and similar vessels, and that part of the tapping device which, in practice, is driven into the bung hole in the operation of tapping the barrel, is tapered or conical in form as shown at $b^2$.

In the practice of my invention, I place on the tapered portion $b^2$ of the packing device a sleeve $c$ composed of rubber, rubber and canvas, or of any other suitable material, and said sleeve is provided at the lower end thereof with a flange or rim $c^2$. Over the flange or rim $c^2$, which together with the sleeve $c$ forms the packing is placed a metal disk or plate $d$, and I also provide a supplemental collar or band $e$ which is placed on the sleeve $c$ and through which are passed screws $f$, said screws being passed downwardly through the collar or band $e$ and being adapted to bear on the disk or plate $d$.

The supplemental collar or band $e$ in the construction shown, is provided with a central opening which is of such size as to fit around the sleeve $c$ at about one-third of the height thereof counting from the flange or rim $c^2$, and in practice when it is desired to open or tap the barrel or other vessel, the end $b^2$ is driven into the bung hole $a^2$ in which operation the bung is driven into the barrel or vessel. In this operation the flange or rim $c^2$ of the sleeve $c$ bears on the barrel or other vessel and is forced into close contact therewith around the bung hole $a^2$ and the screws $c$ are then turned so that the ends thereof press firmly on the disk or plate $d$, and this operation forces the flange or rim $c^2$ into close contact with the barrel or other vessel and also forces the collar or band $e$ upwardly and causes it to securely grasp and hold the sleeve $c$ and to press it into close contact with the tapered portion $b^2$ of the tap $b$. In this way, as will be understood, the barrel or other vessel is not only tapped but the tapping device is securely packed and the contents of the barrel or other vessel cannot escape around the tapered portion of the tapping device.

My improved packing for taps of the class described is simple in construction and operation and may be applied to such devices whenever necessary or wherever required, and it will be apparent that any kind or class of vessels, or the taps for any kind or class of vessels, may be provided with a packing device of this class.

Having fully described my invention, what I claim as new and desire to secure by Letters Patent, is:—

1. A packing for barrel tapping devices, comprising a sleeve of compressible material provided at its lower end with a flange, a plate placed on said flange, an annular member placed on said sleeve above said plate, and screws passed downwardly through said member and adapted to bear on said plate.

2. The combination with the tapered portion of a tapping device, of a packing comprising a flexible sleeve provided at its lower end with a flange, a plate placed on said flange, a collar placed on said sleeve above said plate, and screws passed downwardly through said collar and adapted to bear on said plate.

In testimony that I claim the foregoing as my invention I have signed my name in presence of the subscribing witnesses this 24th day of March 1906.

ABRAHAM W. DOREMUS.

Witnesses:
C. J. KLEIN,
F. A. STEWART.